(12) United States Patent
Kai

(10) Patent No.: US 6,226,571 B1
(45) Date of Patent: May 1, 2001

(54) SURROUNDINGS MONITORING APPARATUS FOR AN AUTOMOTIVE VEHICLE

(75) Inventor: Koichi Kai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/185,009

(22) Filed: Nov. 4, 1998

(30) Foreign Application Priority Data

Jun. 30, 1998 (JP) .................................................. 10-154900

(51) Int. Cl.[7] .................................................. G01C 21/00
(52) U.S. Cl. .................................. 701/1; 701/96; 701/301; 342/455; 340/436
(58) Field of Search .................................. 701/1, 95, 96, 701/70, 300, 301; 342/454, 455; 180/167, 168, 169, 179; 340/901, 903, 435, 436

(56) References Cited

U.S. PATENT DOCUMENTS

| 5,285,523 | * | 2/1994 | Takahashi | 701/1 |
|---|---|---|---|---|
| 5,467,283 | * | 11/1995 | Butsuen et al. | 701/96 |
| 5,479,173 | * | 12/1995 | Yoshioka et al. | 701/1 |
| 5,487,116 | * | 1/1996 | Nakano et al. | 701/1 |
| 5,745,870 | * | 4/1998 | Yamamoto et al. | 701/96 |
| 5,757,949 | * | 5/1998 | Kinoshita et al. | 701/1 |
| 5,878,361 | * | 3/1999 | Sekine et al. | 701/96 |
| 5,999,874 | * | 12/1999 | Winner et al. | 701/96 |
| 6,018,308 | * | 1/2000 | Shirai | 701/1 |

FOREIGN PATENT DOCUMENTS 6-68398    3/1994   (JP) .

* cited by examiner

*Primary Examiner*—Gary Chin
(74) *Attorney, Agent, or Firm*—Sughrue, Mion, Zinn, Macpeak & Seas, PLLC

(57) ABSTRACT

A surroundings monitoring apparatus for an automotive vehicle, which may readily predict a road geography such as a road radius only by lane information of a vehicle and a relative position, includes a radar head 1 for detecting objects that are present around the subject vehicle and for outputting the positional information of the objects in a predetermined detection coordinate system, a vehicle identifying device (step S3) for classifying the vehicles travelling along the road and objects other than the vehicles out of the objects and a road geography prediction device (step S4) for predicting the road geography based upon the position of the travelling vehicles and the lane information in accordance with an output of the radar head and an output of the vehicle identifying device (step S3).

16 Claims, 9 Drawing Sheets

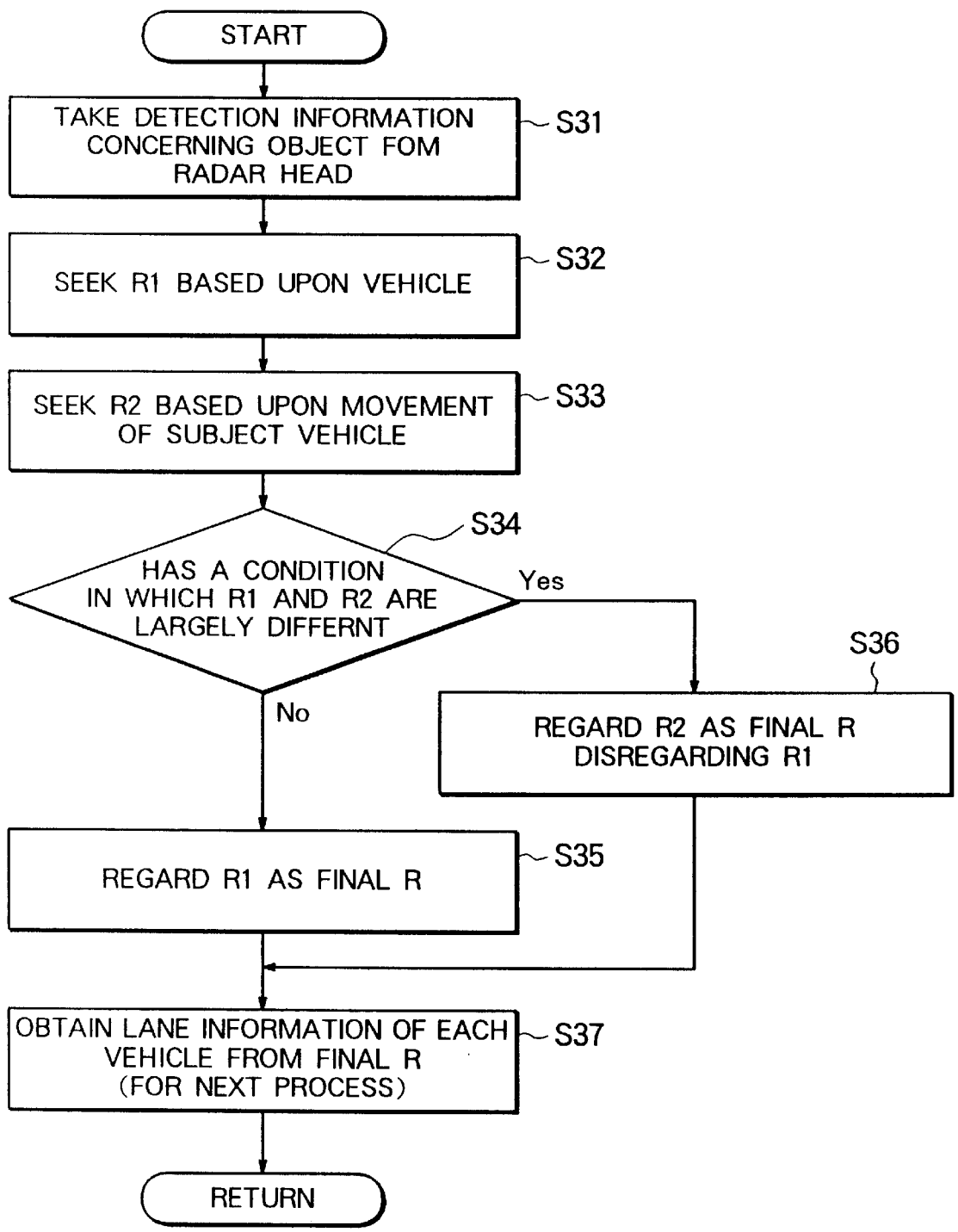

SURROUNDINGS MONITORING APPARATUS FOR AN AUTOMOTIVE VEHICLE

BACKGROUND OF THE INVENTION

The present invention relates to a surroundings monitoring apparatus for an automotive vehicle having a monitoring means such as a radar, and more particularly to a surroundings monitoring apparatus for an automotive vehicle for detecting a road geography such as a road radius of curvature in accordance with positions of vehicles around the subject vehicle detected by the radar of the moving vehicle.

For instance, Japanese Patent Application Laid-Open No. Hei 6-68398 discloses a conventional apparatus. In case of this conventional apparatus, the road geography is predicted in accordance with the movement and the relative position of the vehicles that are travelling continuously in line with the subject vehicle.

In the conventional apparatus, since the road geography (road radius of curvature) is predicted in accordance with the movement and the relative position of the plurality of vehicles that are travelling continuously in line, it is necessary to detect the plurality of the vehicles and it is also necessary to detect the movement of the vehicles, disadvantageously.

Also, the movement of the vehicles does not always follow the road geography. In some cases, the vehicles may take a movement different from the road geography due to the lane change.

SUMMARY OF THE INVENTION

In view of the foregoing defects, an object of the present invention is to provide a surroundings monitoring apparatus for an automotive vehicle, which may readily predict the road geography if at least one vehicle is present.

Also, another object of the present invention is to provide a surroundings monitoring apparatus for an automotive vehicle, which may further enhance the prediction precision in the case where a plurality of vehicles are present.

Also, still another object of the present invention is to provide a surroundings monitoring apparatus for an automotive vehicle, which may reduce the process since it is unnecessary to detect the movement of the vehicle.

Also, yet still another object of the present invention is to provide a surroundings monitoring apparatus for an automotive vehicle, which may exactly predict the road geography even when the vehicle changes lanes in combination with an apparatus for detecting the movement of the subject vehicle.

According to a first aspect of the invention, there is provided a surroundings monitoring apparatus for an automotive vehicle, comprising: a monitoring means for detecting objects that are present around a subject vehicle and for outputting positional information of the vehicle in a predetermined detection coordinate system; a vehicle identifying means for classifying vehicles travelling on the road and objects other than the vehicle out of the objects; and a road geography predicting means for predicting a road geography on the basis of a position of the travelling vehicle and lane information in accordance with an output of the monitoring means and an output of the vehicle identifying means.

According to a second aspect of the invention, in the surroundings monitoring apparatus of the first aspect of the invention, if a plurality of vehicles travelling on the road are present around the subject vehicle, the road geography predicting means predicts the road geography for each vehicle, and excludes values that are largely different among the predicted values.

According to a third aspect of the invention, in the surroundings monitoring apparatus of the first aspect of the invention, the monitoring means includes a subject vehicle movement detecting means for detecting a movement of the subject vehicle, the road geography predicting means predicts the road geography, along which the subject vehicle travels, in accordance with the movement of the subject vehicle, and the prediction value of the road geography along which the subject vehicle travels is compared with the prediction value of the road geography based upon the lane information and the position of the travelling vehicle.

According to a fourth aspect of the invention, in the surroundings monitoring apparatus of the first aspect of the invention, the road geography predicting means judges that the vehicle changes its lanes when the prediction value of the road geography along which the subject vehicle travels is different from the prediction value of the road geography based upon the lane information and the position of the travelling vehicle for a predetermined period of time and by a constant amount.

BRIEF DESCRIPTION OF THE DRAWINGS

In the accompanying drawings:

FIG. 13 is a flowchart showing a process in combination of the R prediction by the vehicle and the prediction of the road radius R based upon the position of the subject vehicle in accordance with the third embodiment of the present invention.

DESCRIPTION OF THE PREFERRED EMBODIMENTS

One embodiment of the present invention will now be described with reference to the accompanying drawings.

Embodiment 1

Figure 1:
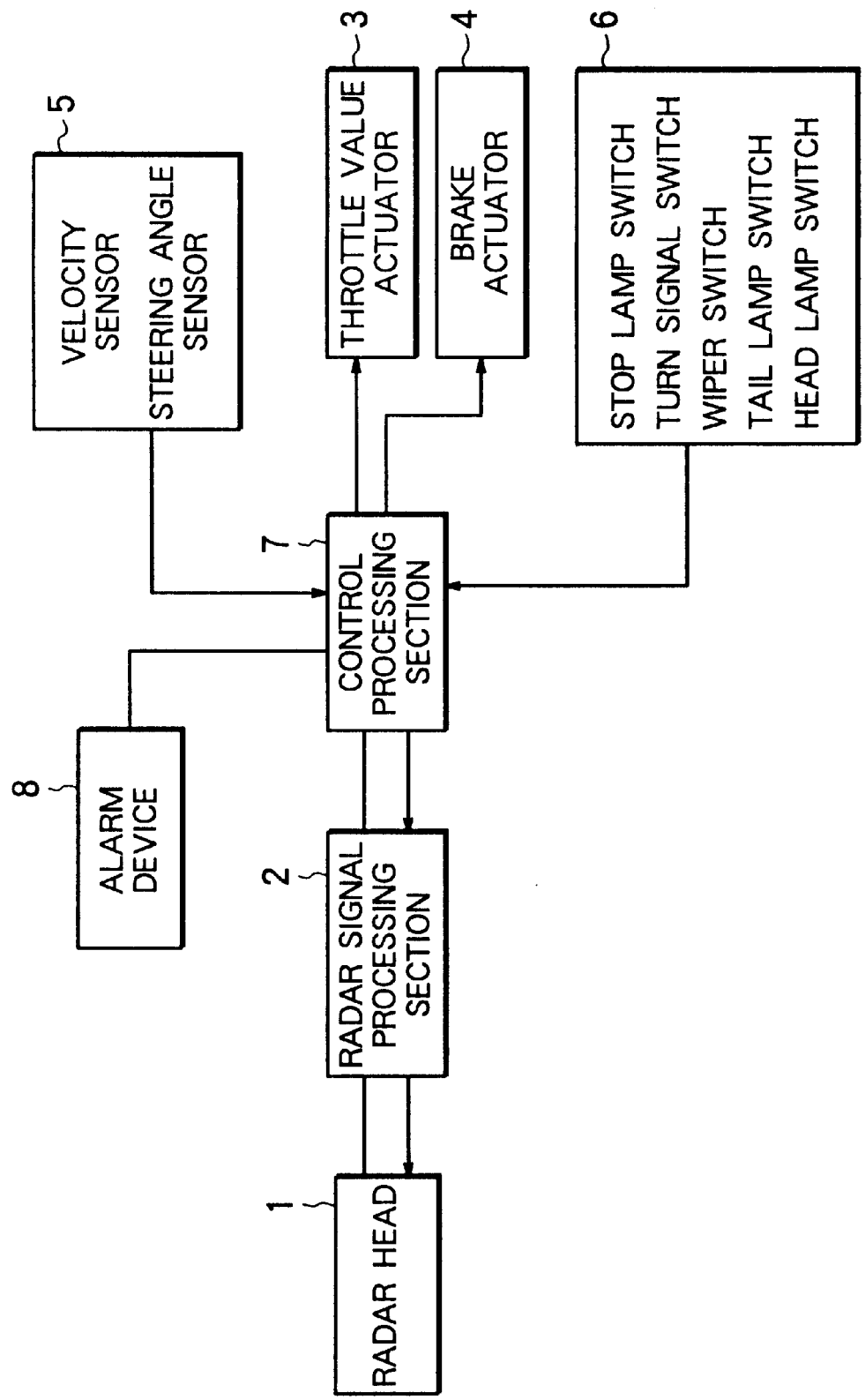
FIG. 1 is a block diagram showing a first embodiment of the present invention.

FIG. 1 shows a block diagram showing a first embodiment of the present invention.

In FIG. 1, a surroundings monitoring apparatus for an automotive vehicle includes a radar head 1 used as a monitoring means for detecting information concerning a distance, a direction and the like of the vehicle, a radar signal processing unit 2 having a vehicle identifying means and a road geography predicting means, a throttle valve actuator 3 for controlling the opening degree of a throttle valve, a brake actuator 4 for performing a brake control, a variety of sensors 5 such as a vehicle velocity sensor and a steering angle sensor, a variety of switches 6 such as a stop switch, a turn signal switch, a wiper switch, a tail lamp switch, a head lamp switch, and a control processing unit 7 for controlling the throttle valve actuator 3 and the brake actuator 4 base upon information from the radar signal processing unit 2, the various sensors 5 and the various switches 6.

In the radar signal processing unit 2, in order to follow a vehicle (hereinafter referred to as a forward vehicle) which travels on the same lane as that of the subject vehicle, the detected forward objects are classified into the subject vehicle, the forward vehicle, vehicles other than these vehicles, delineators on both sides of the road and other stationary objects such as a commercial sign or the like. Also, in order to classify the forward vehicle and the vehicles other than the forward vehicle, the radar signal processing unit 2 predicts the forward road geography (for example, road radius of curvature) to thereby make a decision as to whether the object is the forward vehicle or the objects other than the forward vehicle.

The control processing unit 7 controls the throttle actuator 3 and the brake actuator 4 for obtaining a suitable distance between the subject vehicle and the forward vehicle in accordance with a distance to the forward vehicle and the relative velocity obtained by the radar signal processing unit 2 and information obtained from the vehicle sensor and other sensors. Also, if it is judged that the situation is dangerous, an alarm device 8 alarms to a driver.

The operation will now be described.

Figure 2:
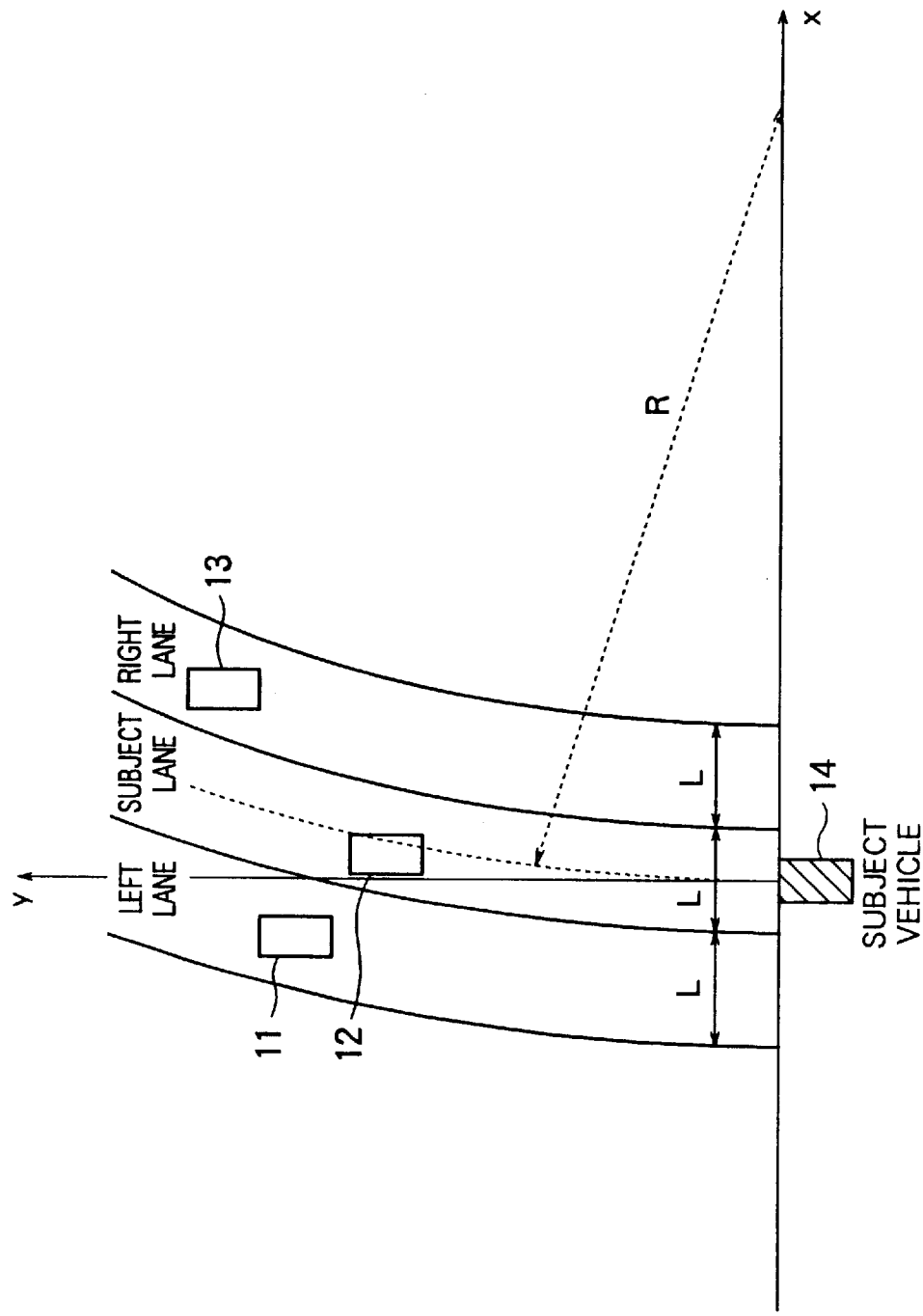
FIG. 2 is an illustration of lane information of vehicles in accordance with the first embodiment of the present invention.

FIG. 2 is a view showing traffic lane information of each vehicle detected by the radar head.

A coordinate system is represented by x-y coordinates where a subject vehicle 14 is located at an original point, the forward direction of the vehicle is expressed by a y-axis, and an x-axis is perpendicular to the y-axis. However, any other suitable coordinate systems may be used therefor. A vehicle 12 travels along the same lane as that for the subject vehicle 14, and vehicles 11 and 13 travel along the left lane and the right lane, respectively.

If the lane information representative of which lane has been traced by each vehicle previously by one measurement cycle (hereinafter simply referred to as "previous cycle") is known, it is assumed that each vehicle currently traces the same lane as that at the previous cycle and it is possible to predict the road geography.

Figure 3:
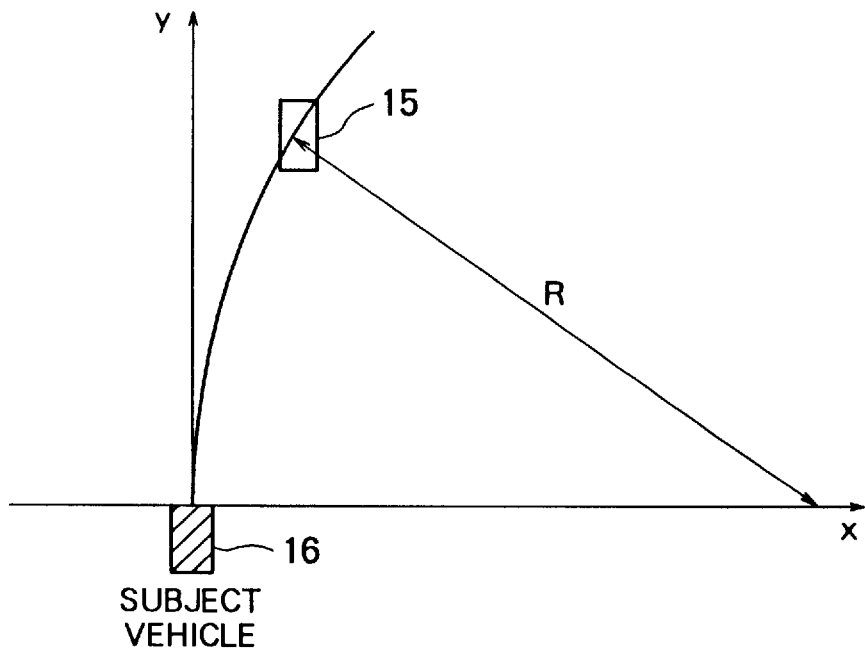
FIG. 3 is a view showing how to predict a road radius R based upon the vehicle travelling along the lane of the subject vehicle in accordance with the first embodiment of the present invention.

FIG. 3 is a view showing how to predict the road radius R based upon the vehicle travelling along the subject lane.

The road radius R is a radius of a circle which passes through the position (x,y) of the vehicle 15 and the original point (i.e., the position of a vehicle 16) and which is tangential with the y-axis at the original point.

If R>>y, it is possible to obtain the road radius R in accordance with an equation, $R=y^2/2x$.

Figure 4:
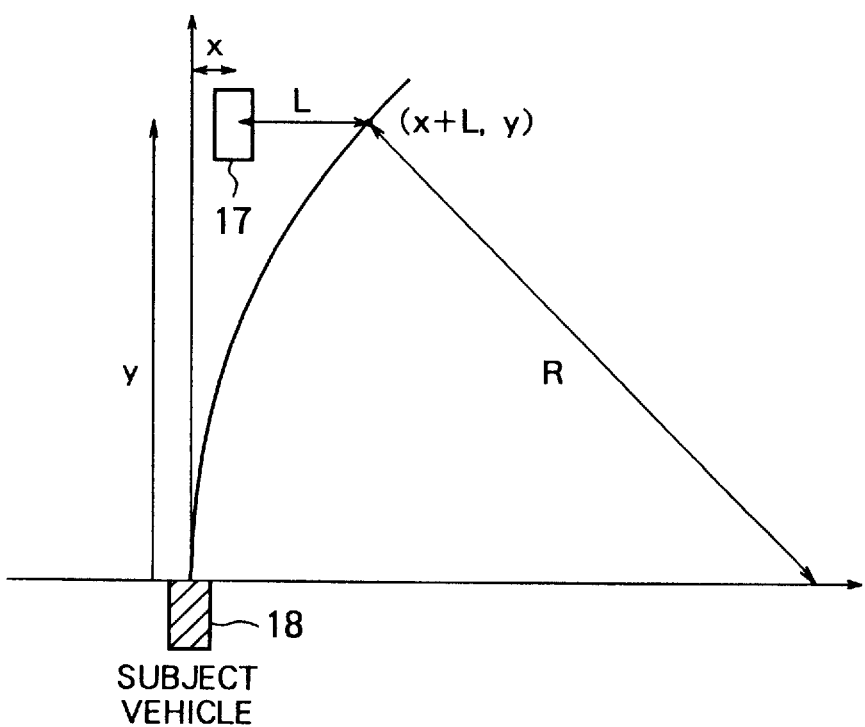
FIG. 4 is a view showing how to predict a road radius R based upon the vehicle travelling along the left lane in accordance with the first embodiment of the present invention.

In the same manner, FIG. 4 is a view showing how to predict the road radius R based upon the vehicle travelling the left lane relative to a subject vehicle 18.

The point (x+L,y) is sought based upon the position (x,y) of a vehicle 17 and a hypothetical lane width (L). The road radius R is predicted in accordance with this point. In the same manner as in the vehicle travelling along the same lane as that of the subject vehicle, if R>>y, it is possible to obtain the road radius R in accordance with an equation, $R=y^2/2(x+L)$.

Since the width of the single lane of a regular expressway is 3.5 m, if the vehicle travels on the expressway at a high speed, L may only be set as 3.5 m.

Figure 5:
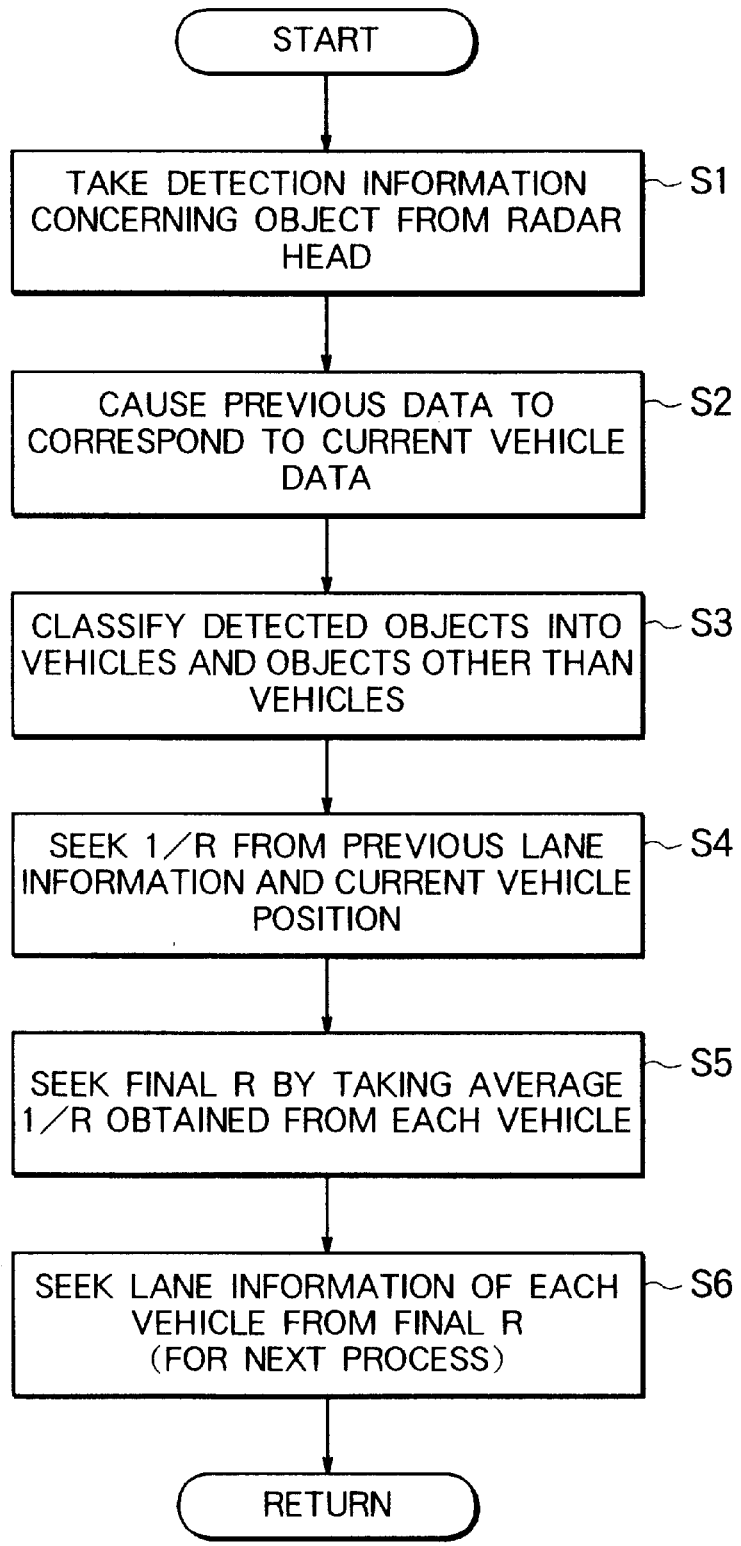
FIG. 5 is a flowchart showing a road R prediction process based upon a vehicle in accordance with the first embodiment of the present invention.

FIG. 5 is a flowchart representative of the prediction process of the road radius R based upon the lane information and the vehicle position relative to the vehicle in the radar signal processing unit 2.

First of all, in step S1, detection information concerning the forward object is picked up from the radar head 1. In step S2, an identification process is performed for conducting a search as to which of the object detected in the previous measurement cycle corresponds to the object currently detected.

Subsequently, in step S3, the classification of the vehicle from the objects other than the vehicle (commercial signs, delineators or the like) is performed in accordance with the relative velocities of the detected objects, the widths of the objects and the like.

In step S4, the curvature 1/R is sought based upon the previous lane information and the current vehicle position for each vehicle. However, the vehicle data detected currently and newly (no previous lane information) are not used for this calculation. The previous lane information is the data to be obtained in step S6.

Subsequently, in step S5, the average of each 1/R obtained in step S4 is taken, and the final road radius R is determined by its inverted value.

Also, in step S6, for the next process, the classification of the left lane, the subject lane and the right lane is performed in accordance with the final road radius R obtained in step S5 and the position of each vehicle and is stored as the lane information.

Incidentally, in the process of the radar signal processing unit 2, the step S3 constitutes a substantially vehicle identification means, and the step S4 constitutes a substantially road geography predicting means.

Thus, in this embodiment, it is possible to predict the road geography (road radius) based upon the lane information and the vehicle position relative to the vehicle classified for each lane, i.e., only with the lane information of the vehicle and the relative position. Also, since it is substantially unnecessary to detect the movement of the vehicle, it is possible to moderate the load for the process.

Embodiment 2

Figure 6:
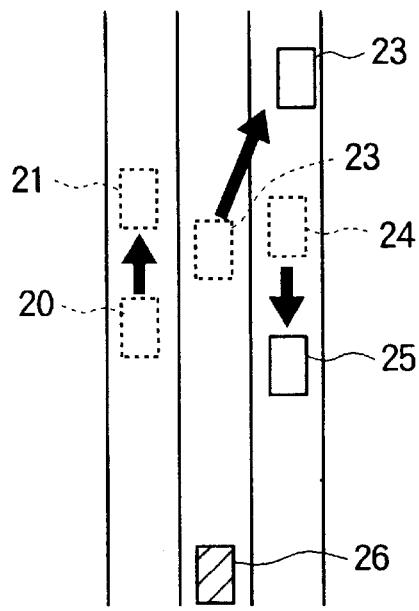
FIG. 6 is a view showing a state where a plurality of vehicles are present for illustrating a second embodiment of the present invention.
Figure 7:
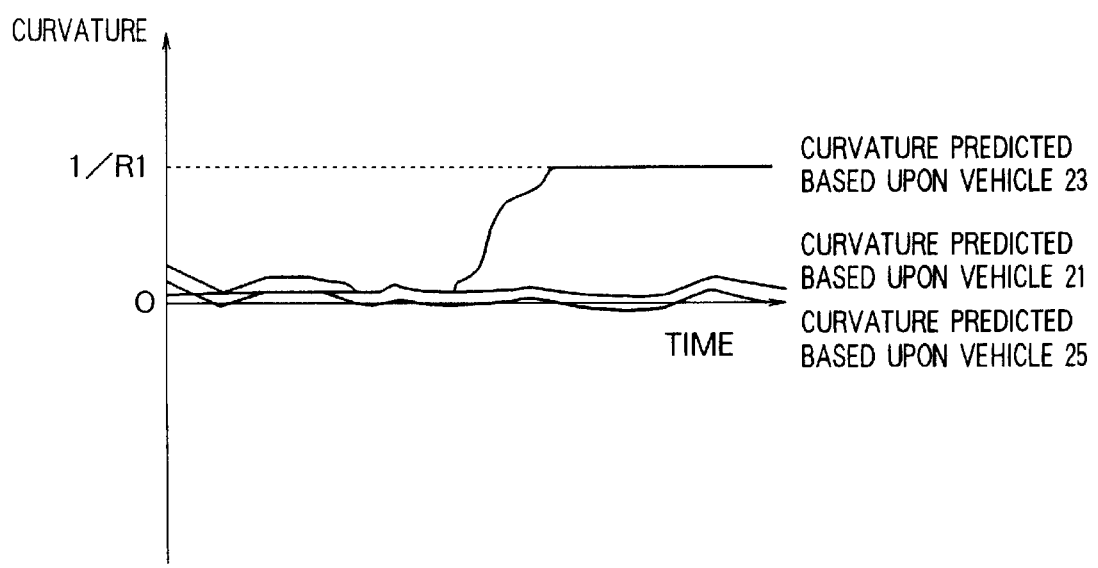
FIG. 7 is a view showing a time change of 1/R predicted based upon the plurality of vehicles in accordance with the second embodiment of the present invention.
Figure 8:
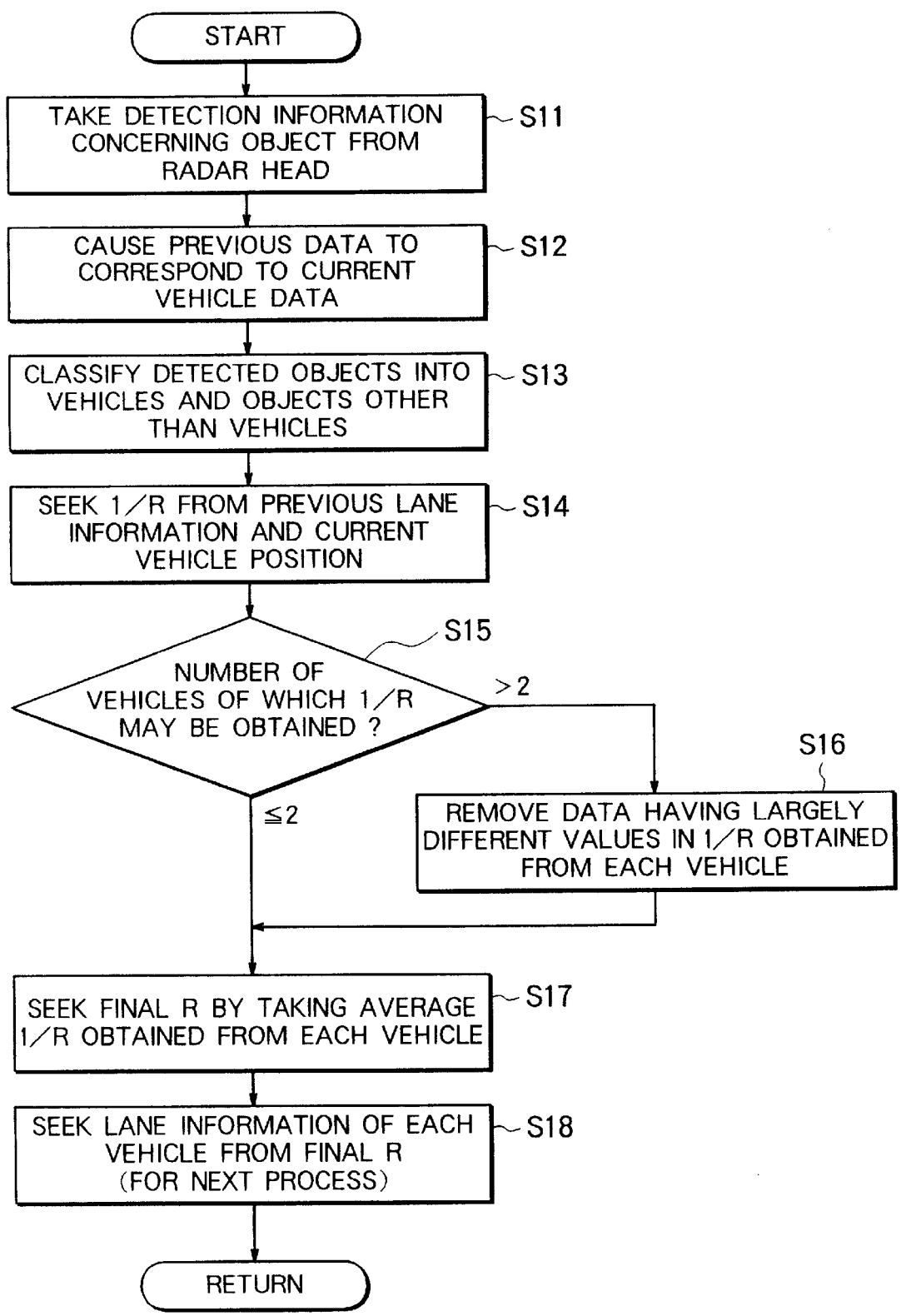
FIG. 8 is a flowchart showing a process for enhancing a performance of the road radius R prediction by disregarding the vehicle that takes a different movement when a plurality of vehicles are present in accordance with the second embodiment of the present invention.

FIGS. 6 to 8 are views illustrating a second embodiment of the present invention. Incidentally, the same circuit structure as that of the first embodiment except for some difference in processing in the radar signal processing unit may be used for the circuit arrangement in this embodiment.

First of all, FIG. 6 is a view showing a state where a plurality of vehicles are present.

In FIG. 6, a vehicle 21 (previous position 20) and a vehicle 25 (previous position 24) travel along the respective lanes but a vehicle 23 (previous position 22) changes the lanes. FIG. 7 shows a time change (curvature) of 1/R predicted based upon the position of each vehicle. Only 1/R predicted based upon the position of the vehicle 23 exhibits a different value from 1/R predicted based upon the positions of the vehicle 21 and the vehicle 25. Accordingly, when the plurality of vehicles are present, it is possible to obtain the more exact road radius R by removing the largely different data out of the values of 1/R predicted in accordance with the relative position of each vehicle.

FIG. 8 is a flowchart of the process for enhancing the precision in prediction of the road radius R by disregarding the vehicle which takes a different movement, when the plurality of vehicles are present in the process in the radar signal processing unit 2.

In step S11, detection information concerning the forward object is picked up from the radar head 1. In step S12, an identification process is performed for conducting a search as to which of the object detected in the previous measurement cycle corresponds to the object currently detected.

Subsequently, in step S13, the classification of the vehicle from the objects other than the vehicle (commercial signs, delineators or the like) is performed in accordance with the relative velocities of the detected objects, the widths of the objects and the like.

In step S14, the curvature 1/R is sought based upon the previous vehicle information and the current vehicle position for each vehicle. However, the vehicle data detected currently and newly (no previous lane information) are not used for this calculation. The previous lane information is the data to be obtained in step S18.

Subsequently, in step S15, the number of the data of 1/R obtained from each vehicle is searched. If the number of the data is equal to or larger than 3, the process goes to step S16, and if the number of the data is equal to or smaller than 2, the process goes to step S17.

The largely different data are removed out of the data of 1/R obtained from each vehicle in step S16. Also, in step S17, the average of each 1/R is taken, and the final road radius R is determined by its inverted value.

Also, subsequently, in step S18, for the next process, the classification of the left lane, the subject lane and the right lane is performed in accordance with the final road radius R obtained in step S17 and is stored as the lane information.

Incidentally, in the process of the radar signal processing unit 2, step S13 constitutes a substantially vehicle identification means, and step S14 constitutes a substantially road geography predicting means.

Thus, in this embodiment, in addition to the effect of the first embodiment, in the case where a plurality of vehicles travelling along the road around the subject vehicle are present, the road geography is predicted based upon the relative position of each vehicle, and the largely different data are removed out of the data. Therefore, it is possible to further enhance the precision in prediction of the road geography.

Embodiment 3

FIGS. 8 to 13 are views illustrating a third embodiment of the present invention. Incidentally, the same circuit arrangement as that of the first embodiment except for some difference in processing in the radar head and the radar signal processing unit may be used for the circuit arrangement in this embodiment.

Figure 9:
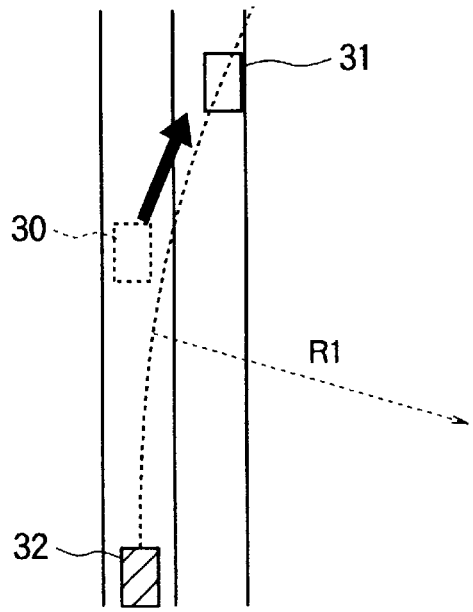
FIG. 9 is a view showing a state where the vehicle changes its lanes for illustrating a third embodiment of the present invention.
Figure 10:
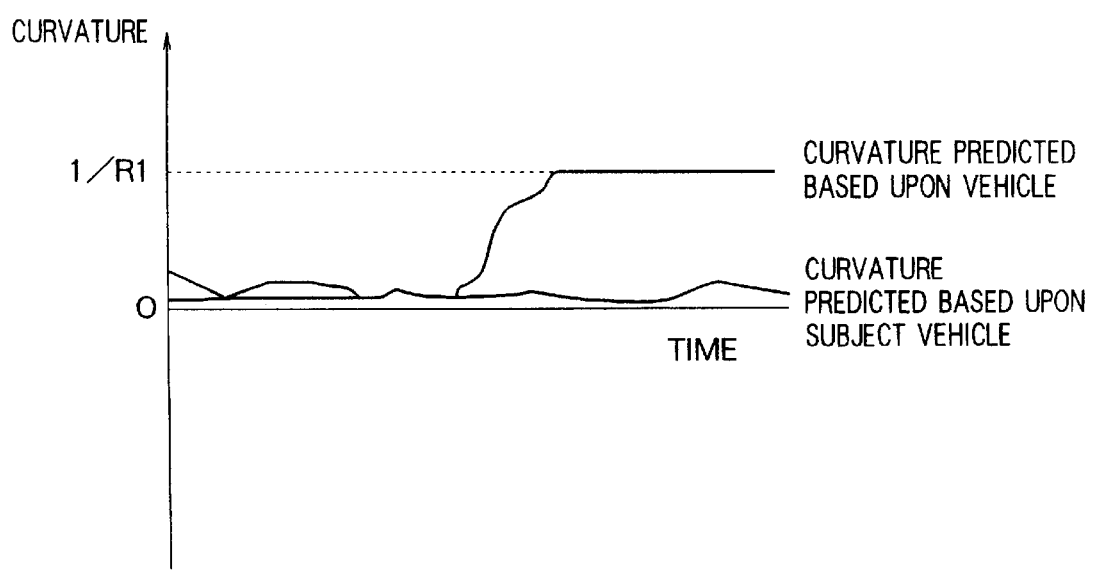
FIG. 10 is a view showing a time change of 1/R when the vehicle changes the lanes in accordance with the third embodiment of the present invention.

In the prediction method in accordance with the first and second embodiments, in the case where only one vehicle 31 (previous position 30) is present as shown in FIG. 9, if this vehicle changes the travelling lanes, the prediction value of the road radius R based upon the vehicle is R1 and becomes different from the actual road geography. Accordingly, an automotive vehicle movement detection means for detecting the movement of the subject vehicle in accordance with a steering angle, a yaw rate sensor and the like is provided in the radar head 1 so that the road radius R of the travelling subject vehicle may be predicted based upon the movement of the subject vehicle. The time change (curvature) of the road radius R predicted based upon the movement of the subject vehicle and the road radius predicted based upon the position of the vehicle are shown in FIG. 10.

Even if the road radius R predicted from the vehicle is changed, there is no change in road radius R predicted based upon the movement of the vehicle. It is therefore understood that the vehicle has changed its lanes.

Figure 11:
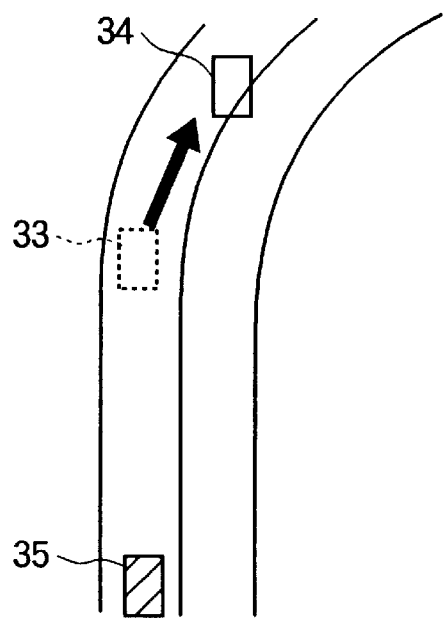
FIG. 11 is a view showing a state where the vehicle enters a curved road in accordance with the third embodiment of the present invention.

The case where the vehicle enters the curved road is shown in FIG. 11.

Figure 12:
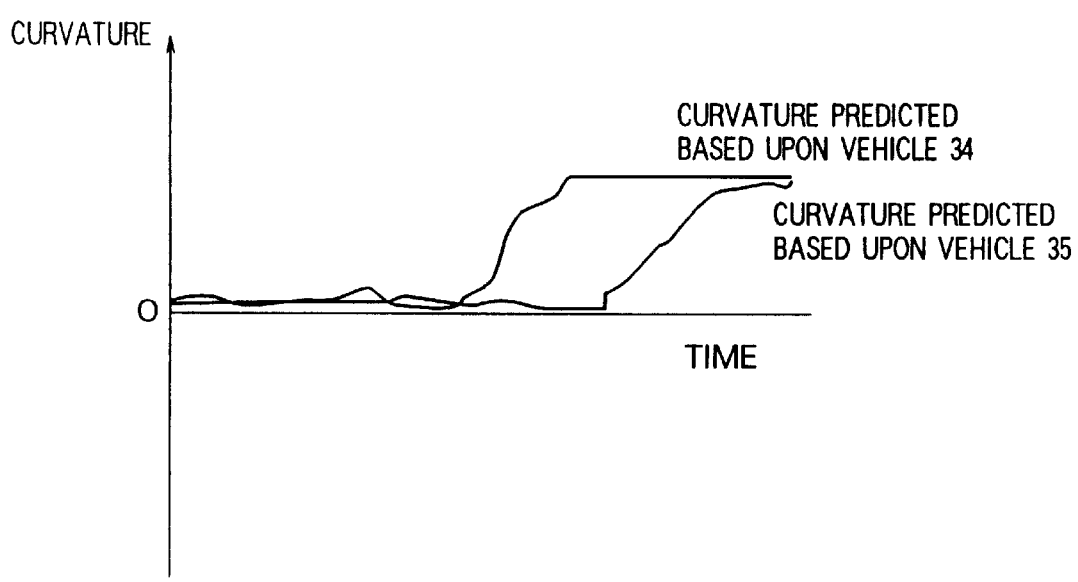
FIG. 12 is a view showing a time change of 1/R when the vehicle enters the curved road in accordance with the third embodiment of the present invention.

In the case where a vehicle 34 (previous position 33) enters the curved road, the time change in road radius R predicted based upon the position of the vehicle 34 and the time change (curvature) in road radius R predicted based upon the movement of a subject vehicle 35 are shown in FIG. 12.

When the vehicle 34 enters the curved road, the road radius R predicted based upon the position of the vehicle 34 starts to change. Thereafter, when the subject vehicle 35 enters the curved road, the road radius R predicted based upon the movement of the subject vehicle 35 is also changed. It is therefore understood that the vehicle does not change its travelling lanes but enters the curved road.

FIG. 13 is a flowchart showing a process in combination of the prediction of the road radius R based upon the position of the vehicle and the prediction of the road radius R based upon the movement of the vehicle in the radar signal processing unit 2.

In step S31, the detection signal concerning the forward object is taken from the radar head 1. In step S32, the prediction of the road radius R based upon the position of the vehicle is performed and its result is used as R1.

In step S33, the movement of the vehicle is obtained based upon the steering angle, the yaw rate and the like, and the change of the road radius R based upon the movement of the subject vehicle is obtained. This result is used as R2.

In step S34, it is investigated whether R1 and R2 are remarkably different from each other and whether this condition is kept for a predetermined period of time. If it continues for the predetermined period of time, the process goes to step S36 and if not, the process goes to step S35.

In step S36, R1 is disregarded, and only R2 is regarded as the final road radius R. The process goes to step S37. In step S35, R1 is regarded as the final road radius R. In step S37, for the next process, the classification of the left lane, the subject lane and the right lane is performed in accordance with the final road radius R and each vehicle position and is stored as the lane information.

Incidentally, in the process of the radar signal processing unit 2, the steps S32 and S33 constitute a substantially road geography predicting means.

Thus, in accordance with this embodiment, the prediction process of the road radius based upon the movement of the subject vehicle is additionally used, the road geography prediction value obtained based upon the position of the vehicle is compared with the road geography prediction value obtained based upon the movement of the subject vehicle, and it is judged that the vehicle changes the travelling lanes when both values are different from each other for a constant period of time and by a constant amount, thereby reducing the affect to the road geography prediction. It is therefore possible to exactly predict the road radius even if the vehicle changes the travelling lanes.

What is claimed is:

1. A surroundings monitoring apparatus for a subject automotive vehicle, comprising:
    monitoring means for detecting objects, including a vehicle traveling on a road on which the subject vehicle is traveling, that are present around the subject vehicle and for outputting positional information of the traveling vehicle in a predetermined detection coordinate system;
    vehicle identifying means for classifying the travelling vehicle and objects other than the travelling vehicle; and
    road geography predicting means for predicting a road curvature value on the basis of a position of the travelling vehicle, in accordance with an output of said monitoring means and an output of said vehicle identifying means, and lane information of said travelling vehicle.

2. The surroundings monitoring apparatus according to claim 1, wherein if a plurality of vehicles travelling on the road are present around the subject vehicle, said road geography predicting means predicts the road curvature value for each travelling vehicle, and excludes values that are largely different among the predicted values.

3. The surroundings monitoring apparatus according to claim 1, wherein said monitoring means includes a subject vehicle movement detecting means for detecting a movement of the subject vehicle, said road geography predicting means predicts another road curvature value, along which the subject vehicle travels, in accordance with the movement of the subject vehicle, and the prediction value of the road curvature along which the subject vehicle travels is compared with the prediction value of the road curvature based upon the lane information and the position of the travelling vehicle.

4. The surroundings monitoring apparatus according to claim 3, wherein said road geography predicting means judges that the travelling vehicle changes its lanes when the prediction value of the road curvature along which the subject vehicle travels is different from the prediction value of the road curvature based upon the lane information and the position of the travelling vehicle for a predetermined period of time and by a constant amount.

5. The surroundings monitoring apparatus according to claim 1, wherein said lane information is determined based on a previous road curvature value predicted by said road geography predicting means in a previous iteration.

6. A surroundings monitoring apparatus for a subject automotive vehicle, comprising:
    monitoring means for detecting objects, including a vehicle traveling on a road on which the subject vehicle is traveling, that are present around the subject vehicle and for outputting positional information of the traveling vehicle in a predetermined detection coordinate system;
    vehicle identifying means for classifying the travelling vehicle and objects other than the travelling vehicle; and
    road geography predicting means for predicting a road geography value on the basis of a position of the travelling vehicle, in accordance with an output of said monitoring means and an output of said vehicle identifying means, and lane information of said travelling vehicle; and
    wherein said monitoring means includes a subject vehicle movement detecting means for detecting a movement of the subject vehicle, said road geography predicting means predicts another road geography value, along which the subject vehicle travels, in accordance with the movement of the subject vehicle, and the prediction value of the road geography along which the subject vehicle travels is compared with the prediction value of the road geography based upon the lane information and the position of the travelling vehicle.

7. The surroundings monitoring apparatus according to claim 6, wherein said road geography predicting means judges that the travelling vehicle changes its lanes when the prediction value of the road geography along which the subject vehicle travels is different from the prediction value of the road geography based upon the lane information and the position of the travelling vehicle for a predetermined period of time and b) a constant amount.

8. The surroundings monitoring apparatus according to claim 6, wherein if a plurality of vehicles travelling on the road are present around the subject vehicle, said road geography predicting means predicts the road geography value for each travelling vehicle, and excludes values that are largely different among the predicted values.

9. The surroundings monitoring apparatus according to claim 6, wherein said lane information is determined based on a previous road geography value predicted by said road geography predicting means in a previous iteration.

10. A surroundings monitoring apparatus for a subject automotive vehicle, comprising:
    a monitor which detects objects, including a vehicle traveling on a road on which the subject vehicle is traveling, that are present around the subject vehicle and which outputs positional information of the traveling vehicle in a predetermined detection coordinate system;
    a vehicle identifier which classifies the travelling vehicle and objects other than the travelling vehicle; and
    a road geography predictor which predicts a road geography value on the basis of a position of the travelling vehicle, in accordance with an output of said monitor and an output of said vehicle identifier, and lane information of said travelling vehicle; and
    wherein said monitor includes a subject vehicle movement detector which detects a movement of the subject vehicle, said road geography predictor predicts another road geography value, along which the subject vehicle travels, in accordance with the movement of the subject vehicle, and the prediction value of the road geography along which the subject vehicle travels is compared with the prediction value of the road geography based upon the lane information and the position of the travelling vehicle.

11. The surroundings monitoring apparatus according to claim 10, wherein said road geography predictor judges that the travelling vehicle changes its lanes when the prediction value of the road geography along which the subject vehicle travels is different from the prediction value of the road geography based upon the lane information and the position of the travelling vehicle for a predetermined period of time and by a constant amount.

12. The surroundings monitoring apparatus according to claim 10, wherein if a plurality of vehicles travelling on the road are present around the subject vehicle, said road geography predictor predicts the road geography value for each travelling vehicle, and excludes values that are largely different among the predicted values.

13. The surroundings monitoring apparatus according to claim 10, wherein said lane information is determined based on a previous road geography value predicted by said road geography predictor in a previous iteration.

14. A surroundings monitoring apparatus for a subject automotive vehicle, comprising:
- a monitor which detects objects, including a vehicle traveling on a road on which the subject vehicle is traveling, that are present around the subject vehicle and which outputs positional information of the traveling vehicle in a predetermined detection coordinate system;
- a vehicle identifier which classifies the travelling vehicle and objects other than the travelling vehicle; and
- a road geography predictor which predicts a radius of curvature, R, of the road on the basis of a position of the travelling vehicle, in accordance with an output of said monitor and an output of said vehicle identifier, and lane information of said travelling vehicle.

15. The surroundings monitoring apparatus for a subject automotive vehicle according to claim 14, wherein said road geography predictor which predicts said radius of curvature, R, is based on the following equation (1):

$$R = y^2/2x \quad (1);$$

and wherein x and y are coordinates representing the position of the travelling vehicle relative to the subject vehicle.

16. The surroundings monitoring apparatus according to claim 14, wherein said lane information is determined based on a previous radius of the road curvature predicted by said road geography predictor in a previous iteration.

* * * * *